United States Patent
Tekchandani

(10) Patent No.: US 10,341,368 B2
(45) Date of Patent: Jul. 2, 2019

(54) SELECTIVE MODIFICATION OF DATA PACKETS FOR NETWORK TOOL VERIFICATION

(71) Applicant: Gigamon Inc., Santa Clara, CA (US)

(72) Inventor: Navin C. Tekchandani, San Jose, CA (US)

(73) Assignee: Gigamon Inc., Santa Clara, CA (US)

(*) Notice: Subject to any disclaimer, the term of this patent is extended or adjusted under 35 U.S.C. 154(b) by 526 days.

(21) Appl. No.: 15/003,453

(22) Filed: Jan. 21, 2016

(65) Prior Publication Data
US 2017/0214703 A1 Jul. 27, 2017

(51) Int. Cl.
*H04L 12/26* (2006.01)
*H04L 29/06* (2006.01)

(52) U.S. Cl.
CPC .......... *H04L 63/1425* (2013.01); *H04L 43/00* (2013.01); *H04L 43/026* (2013.01); *H04L 43/50* (2013.01); *H04L 63/02* (2013.01); *H04L 63/1416* (2013.01); *H04L 63/1433* (2013.01); *G06F 2221/034* (2013.01); *H04L 63/1408* (2013.01)

(58) Field of Classification Search
CPC ......... G06F 2221/033; G06F 2221/034; H04L 43/00; H04L 43/026; H04L 43/50; H04L 43/14; H04L 43/0823; H04L 41/06; H04L 41/08–41/0806; H04L 63/1408; H04L 63/1425

See application file for complete search history.

(56) References Cited

U.S. PATENT DOCUMENTS

| | | | | |
|---|---|---|---|---|
| 8,248,958 B1* | 8/2012 | Tulasi | ..................... | H04L 43/50 370/241 |
| 8,289,845 B1* | 10/2012 | Baldonado | .............. | H04L 43/50 370/229 |
| 9,813,448 B2* | 11/2017 | Matityahu | ............... | H04L 43/12 |
| 2012/0054548 A1* | 3/2012 | Tang | ...................... | G06F 11/26 714/32 |
| 2012/0311132 A1* | 12/2012 | Tychon | ............... | H04L 41/5038 709/224 |
| 2015/0103679 A1* | 4/2015 | Tessmer | ............. | H04L 43/0811 370/252 |

* cited by examiner

*Primary Examiner* — Daniel B Potratz
(74) *Attorney, Agent, or Firm* — Perkins Coie LLP

(57) ABSTRACT

A network appliance may be coupled to a network tool configured to monitor the traffic within a computer network. Often, the network tool is operable in two modes (i.e., an inline mode and an out-of-band mode). Before the network tool is deployed as an inline device, however, it is desirable to verify that the network tool is secure. Described herein are systems and techniques for verifying network tools prior to deployment as inline devices. More specifically, the network appliance may be configured to modify the content of a data packet (e.g., by altering a bit) and transmit the modified data packet downstream to a network tool. The network appliance can monitor the network tool to make sure the network tool drops or returns the modified data packet. These techniques allow the network appliance to controllably simulate the receipt of malicious traffic by the network tool.

20 Claims, 10 Drawing Sheets

SELECTIVE MODIFICATION OF DATA PACKETS FOR NETWORK TOOL VERIFICATION

FIELD OF THE INVENTION

At least one embodiment of the present disclosure pertains to systems and techniques for verifying proper operation of network tools, and more particularly, to techniques for modifying data packets to mimic malicious traffic.

BACKGROUND

Traffic in a computer network can be analyzed to improve real-time decision-making for network operations, security techniques, etc. The traffic may be acquired at numerous entry points by a variety of devices and/or applications (collectively referred to as "nodes" in the computer network) to provide extensive visibility of network flow and security. Given the complexity and volume of traffic routed through many infrastructures, various kinds of network tools are often used to identify, analyze and/or handle security threats to the computer network, bottlenecks in the network, etc. Examples of such network tools include an intrusion detection system (IDS) or an intrusion prevention system (IPS).

A network tool can operate as an in-band (i.e., "inline") device or an out-of-band device. Out-of-band devices operate outside of the path of data traffic between a sending endpoint node and a receiving endpoint node and receive copies of the data packets that make up the data traffic, rather than the original data packets. Out-of-band devices are able to freely modify the copies of the data packets because the original data packets are allowed to traverse the network unimpeded. Inline devices, on the other hand, operate within the path of data traffic between a sending endpoint node and a receiving endpoint node and receive and forward the original data packets. Consequently, vulnerabilities in the security of an inline device can pose a significant threat to the security of the computer network as a whole.

It may be desirable in some instances to deploy a network tool as an inline device rather than an out-of-band device. For example, an inline device may be able to more quickly and effectively identify security threats to the computer network than an out-of-band device. Although changing the deployment of a network tool is a relatively simple process, verifying that the network tool does not create a security vulnerability in the computer network can be difficult and tedious.

BRIEF DESCRIPTION OF THE DRAWINGS

One or more embodiments of the present invention are illustrated by way of example and not limitation in the figures of the accompanying drawings, in which like references indicate similar elements.

DETAILED DESCRIPTION

Figure 1A:
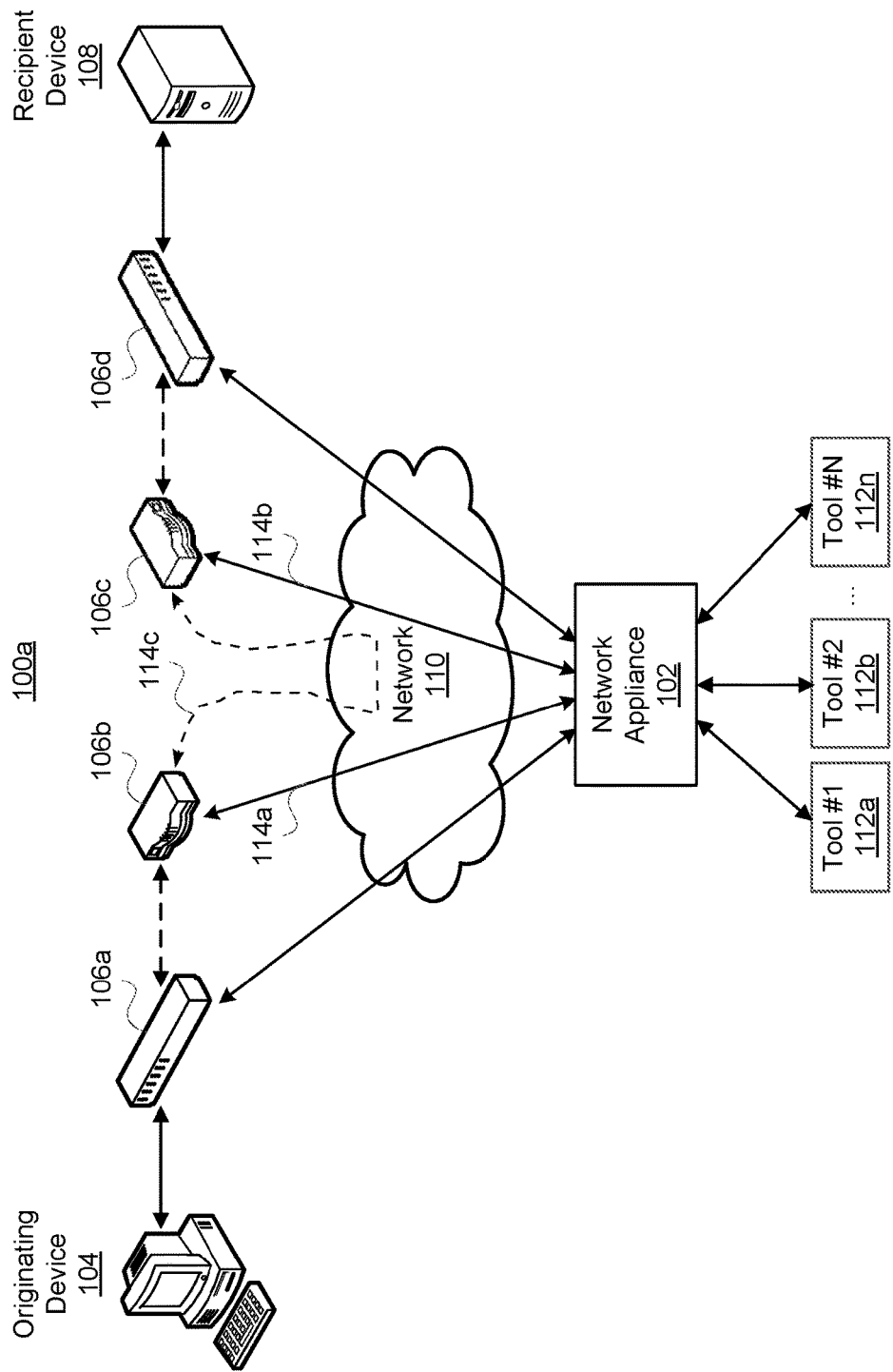
FIG. 1A depicts an example of a network arrangement in which a network appliance receives data packets from nodes in a computer network.

In this description, references to "an embodiment," "one embodiment," and the like, mean that the particular feature, function, structure, or characteristic being described is included in at least one embodiment introduced here. Occurrences of such phrases in this specification do not necessarily all refer to the same embodiment, nor are the embodiments referred to herein necessarily mutually exclusive.

A network appliance may be a node in a computer network and may be configured to receive data packets from one or more other nodes within the computer network. Often a network appliance is coupled to a network tool configured to analyze the data packets (or copies of the data packets), monitor the traffic within the computer network, and/or attempt to block or stop the transmission of abnormal (e.g., malicious) data packets. One purpose of the network appliance may be to facilitate transmission of data packets to the network tool. At any given time, the network tool may be operable in two modes, e.g., an inline mode and an out-of-band mode. That is, the network tool can be deployed as an inline device or an out-of-band device. Consequently, any interruptions in an inline device's ability to manage the network traffic (e.g., due to security vulnerabilities) affect the functionality and availability and can compromise the security of the computer network as a whole.

Therefore, it is desirable to verify that the network tool is secure (e.g., acting in accordance with a security protocol) before the network tool is deployed as an inline device. Described herein are systems and techniques for verifying (e.g., by a network appliance) that a network tool (e.g., an intrusion prevention system (IPS) or an intrusion detection system (IDS)) is operating correctly prior to deployment of the tool as an inline device in a network. More specifically, by employing the techniques described herein, a network appliance can controllably simulate the transmission of malicious traffic to the network tool to ensure that the network tool responds appropriately upon receiving abnormal (e.g., malicious) or unexpected traffic.

In certain embodiments, the network appliance can be configured to modify a data packet that it receives (e.g., at a network port) from a node in the computer network. Upon receiving the data packet, the network appliance can identify a flow map corresponding to the data packet. A flow map specifies a policy for how data packets received by a network appliance are to be handled (e.g., aggregated, filtered, modified, forwarded). Generally, the flow map is selected from a group of flow maps based on one or more characteristics of the data packet, such as the communication protocol of which the data packet is a part, the network port (of the network appliance) on which the data packet was received, the source node from which the data packet was received, or a session feature (e.g., a timestamp).

The network appliance can then determine whether a simulated error mode is currently enabled for the flow map corresponding to the data packet. If the simulated error mode is enabled, the network appliance modifies the data packet (e.g., by altering one or more bits in the control information or payload). The modified data packet, which is intended to mimic malicious traffic, is passed by the network appliance to a tool port for transmission downstream to the network tool.

After transmitting the modified data packet, the network appliance monitors the network tool's reaction (if any) to the modified data packet. The network appliance could also be connected to the network tool and configured to receive the modified data packet back from the network tool to monitor the network tool's response. In such embodiments, the network tool is both downstream and upstream of the network appliance. If the network tool responds appropriately (e.g., by blocking the modified data packet to the network appliance), the network appliance can notify an administrator that it is safe to deploy the network tool as an inline device. However, if the network tool (erroneously) forwards the modified data packet back to the network appliance, the network appliance can alert the administrator that the network tool may not be operating properly.

The techniques introduced herein allow the network appliance to controllably simulate the receipt of malicious traffic by the network tool and observe the network tool's response to receiving the simulated malicious traffic. By selectively modifying data packets transmitted to the network tool, the network appliance can ensure the network tool reacts as it should in response to receiving abnormal (e.g., malicious) traffic. Moreover, because the network appliance is responsible for modifying the data packets, the network appliance "knows" which data packets transmitted downstream to the network tool should be blocked by the network tool (i.e., not forwarded by the network tool back to the network appliance via the network appliance's return tool port). These techniques may be particularly useful in testing effectiveness and verifying security of the network tool, particularly when the network tool nears or exceeds its maximum processing capacity.

Also introduced herein are GUIs that allow an administrator to indicate whether a simulated error mode should be enabled or disabled for a given flow map. A flow map specifies a policy for how data packets received by a network appliance are to be handled. Each flow map can include rules for aggregating, filtering, modifying, and/or forwarding data packets received by the network appliance. Each flow map could be associated with, for example, a network port (of the network appliance), the source node (i.e., the node from which the data packet(s) are received), or a characteristic of the data packet(s), such as communication protocol, timestamp, etc. Flow maps are generally specified by the administrator (e.g., owner or user of the network appliance) rather than the manufacturer of the network appliance. The flow maps can be embodied within software, hardware, or some combination thereof.

A network appliance typically stores many (e.g., hundreds or thousands of) flow maps within a memory within or accessible to the network appliance, such that those flow maps can be quickly retrieved and applied by the network appliance upon receiving a data packet. The GUIs described herein allow the administrator to specify whether a simulated error mode should be enabled or disabled for each flow map (i.e., on a per-flow map basis). When the simulated error mode is enabled for a flow map, data packet(s) associated with that flow map are modified by the network appliance so that they appear to be malicious data traffic. Modification of the data packet(s) is performed in addition to any actions (e.g., aggregating, filtering, forwarding, manipulating) normally required by the flow map.

The GUIs also allow the administrator to connect and monitor network tools that the administrator intends to deploy as inline devices in the future. For example, the administrator could elect to perform a series of security tests (e.g., by enabling the simulated error mode for increasing durations of time) to ensure that a new network tool can be safely deployed as an inline device.

General System Overview

FIG. 1A depicts an example of a network arrangement 100a in which a network appliance 102 receives data packets from multiple devices and/or applications (collectively referred to as "nodes") in a computer network 110. The nodes (e.g., switches 106a, 106d and routers 106b, 106c) couple an originating device 104 (e.g., desktop computer system) to a destination device 108 (e.g., server) and allow data packets to be transmitted between the originating device 104 and the destination device 108. Examples of nodes include switches, routers, and network taps.

Each node represents an entry point into the computer network 110. The entry points, however, could be, and often are, from different points within the computer network 110. Generally, at least some of the nodes are operable to transmit data packets received as network traffic (or duplicate copies of the data packets) to a network appliance 102 for analysis. Thus, network traffic is directed to network appliance 102 by a node that provides an entry point into the computer network 110.

Whether a node transmits the original data packets or copies of the data packets to a device downstream of the node (e.g., the network appliance) depends on whether the downstream device is an inline device or an out-of-band device. As noted above, inline devices receive the original data packets, while out-of-band devices receive copies of original data packets. Generally, the network appliance 102 is deployed as an inline device and, thus, receives original data packets from whichever device is immediately upstream of the network appliance 102.

Here, for example, the network appliance 102 can receive original data packets from node 106b (e.g., via transmission path 114a) and pass at least some of the original data packets to node 106c (e.g., via transmission path 114b). Because node 106b is able to transmit network traffic downstream through the network appliance 102, node 106b need not be coupled directly to node 106c (i.e., transmission path 114c may not exist). Some or all of the nodes within the computer network can be configured in a similar fashion.

When the network appliance is deployed as an inline device, data packets are received by the network appliance at a (physical) network port of the network appliance. For example, data packets transmitted by node 106b via transmission path 114a are received by the network appliance 102 at a particular network port. The network appliance may include multiple network ports coupled to different nodes in the computer network 110. The network appliance 102 can be, for example, a monitoring platform that includes a chassis and interchangeable blades offering various functionalities, such as enhanced packet distribution and masking/filtering capabilities.

The network appliance 102 can also include multiple (physical) tool ports coupled to different network tools 112*a-n*. As further described below, each network tool 112*a-n* can be deployed as an inline device or an out-of-band device at any given point in time. An administrator of the network appliance 102 may be able to switch the deployment mode of one or more of the network tools 112*a-n*. That is, the administrator may be able to deploy an out-of-band network tool as an inline device and vice versa. When a network tool is deployed as an out-of-band device, the network appliance 102 creates a duplicate copy of at least some of the data packets received by the network appliance 102, and then passes the duplicate copies to a tool port for transmission downstream to the out-of-band network tool. When a network tool is deployed as an inline device, the network appliance passes at least some of the original data packets to a tool port for transmission downstream to the inline network tool, and those packets are then normally subsequently received back from the tool at a separate tool port of the network appliance, assuming the packets are not blocked by the tool.

Figure 1B:
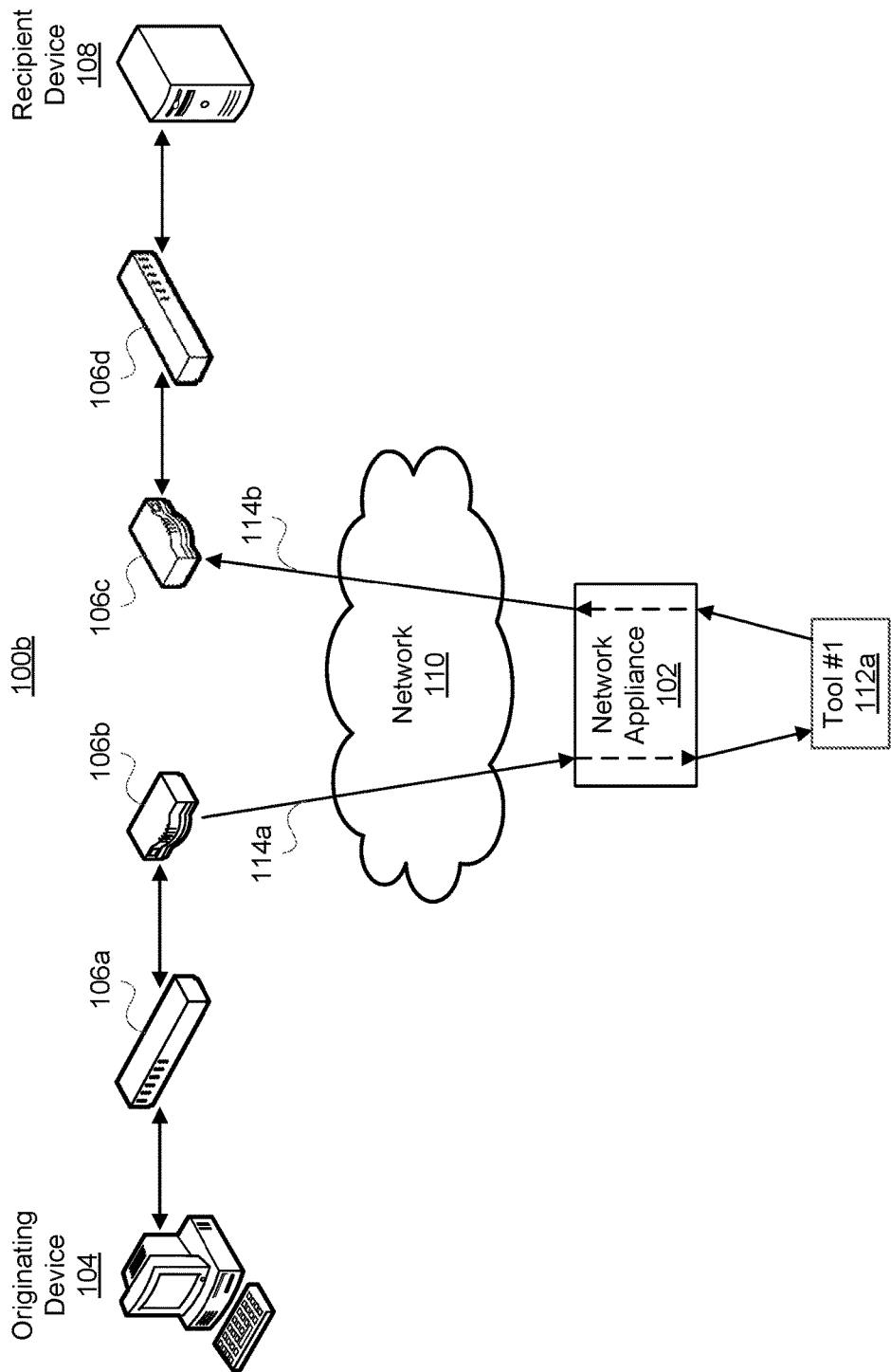
FIG. 1B depicts another example of a network arrangement in which a network appliance receives data packets from a node in a computer network.

FIG. 1B illustrates an example path of a data packet as the data packet travels from an originating device 104 to a destination device 108. More specifically, FIG. 1B depicts a network arrangement 100*b* in which the network appliance 102 and a network tool 112*a* are both deployed as inline devices (i.e., within the flow of network traffic). Although the transmission paths connecting network appliance 102 and tool 112*a* are half duplex wires (i.e., only transmit information in one direction), full duplex wires capable of transmitting information in both directions could also be used for some or all of the transmission paths between nodes of the computer network.

Upon receiving a data packet from node 106*b*, the network appliance 102 identifies a flow map corresponding to the data packet based on one or more characteristics of the data packet. For example, the characteristic(s) could include the communication protocol of which the data packet is a part (e.g., HTTP, TCP, IP) or a session feature (e.g., a timestamp). Additionally or alternatively, the proper flow map could be identified based on the network port (of the network appliance) on which the data packet was received, or the source node from which the data packet was received.

The flow map represents a policy for how the data packet is to be handled by the network appliance 102. For example, the flow map could indicate that the data packet is to be aggregated with another data packet, filtered, modified (e.g., stripped of a header or payload), or forwarded to one or more tool ports. Moreover, the flow map could specify that the data packet is to be transmitted in a one-to-one configuration (i.e., from a network port of the network appliance 102 to a tool port of the network appliance 102) or one-to-many configuration (i.e., from a network port of the network appliance 102 to multiple tool ports of the network appliance 102). Similarly, a single tool port of the network appliance 102 could receive data packets from one or more network ports of the network appliance 102.

Often, the data packet is passed (e.g., by a processor of the network appliance 102) to a tool port for transmission downstream to a network tool (e.g., a monitoring and/or security-related tool). Here, for example, the flow map may specify that the data packet is to be passed by the network appliance 102 to a tool port for transmission downstream to tool 112*a*. The network appliance may aggregate or modify the data packet in accordance with the policy specified by the flow map before passing the data packet to a tool port for transmission downstream to the network tool 112*a*. In some embodiments, the network appliance 102 includes multiple tool ports, each of which is coupled to a different network tool.

After analyzing the data packet, the tool 112*a* normally transmits the data packet back to the network appliance 102 (i.e., assuming the tool 112*a* does not determine that the packet should be blocked), which passes the data packet to a network port for transmission downstream to another node (e.g., node 106*c*). Because the data packet is transmitted from node 106*b* to node 106*c* through the network appliance 102 and tool 112*a*, it is important to quickly and accurately identify potentially malicious data traffic before forwarding the traffic to downstream devices.

Simulated Error Mode

Figure 2A:
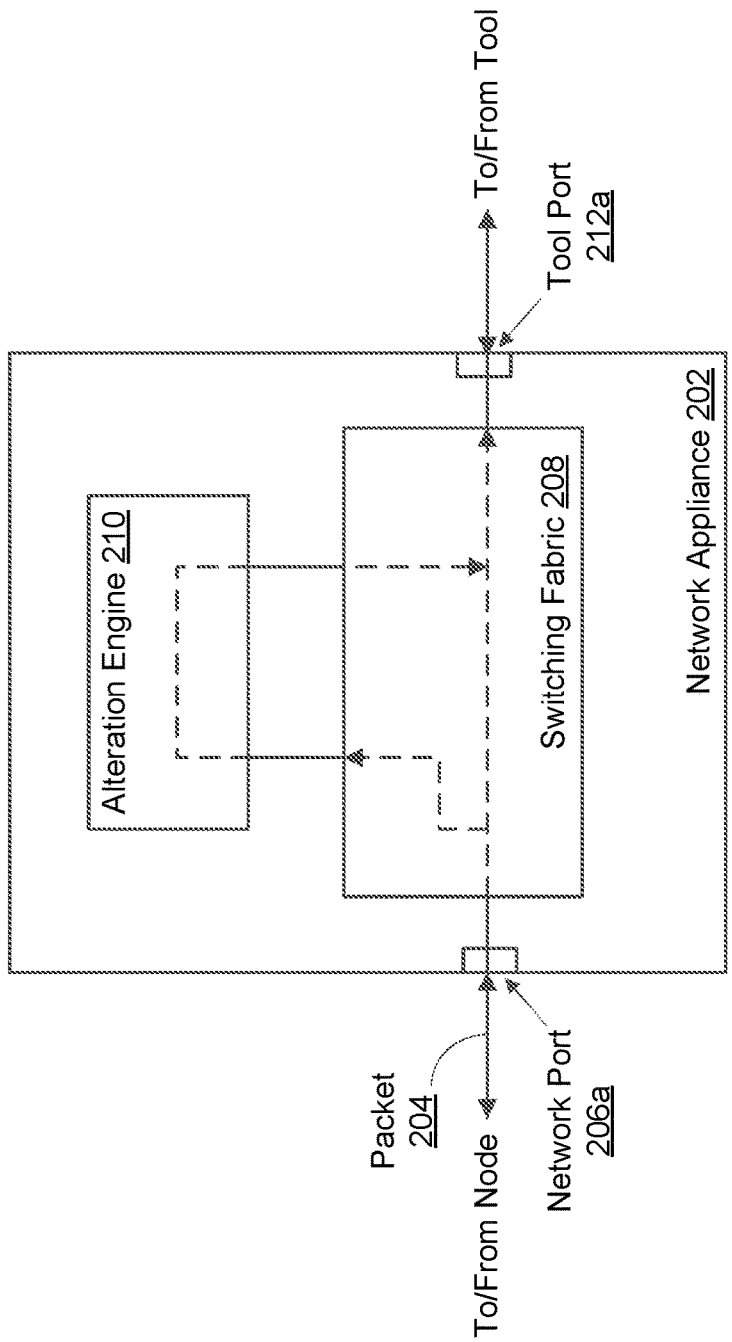
FIG. 2A illustrates an embodiment of a network appliance.
Figure 2B:
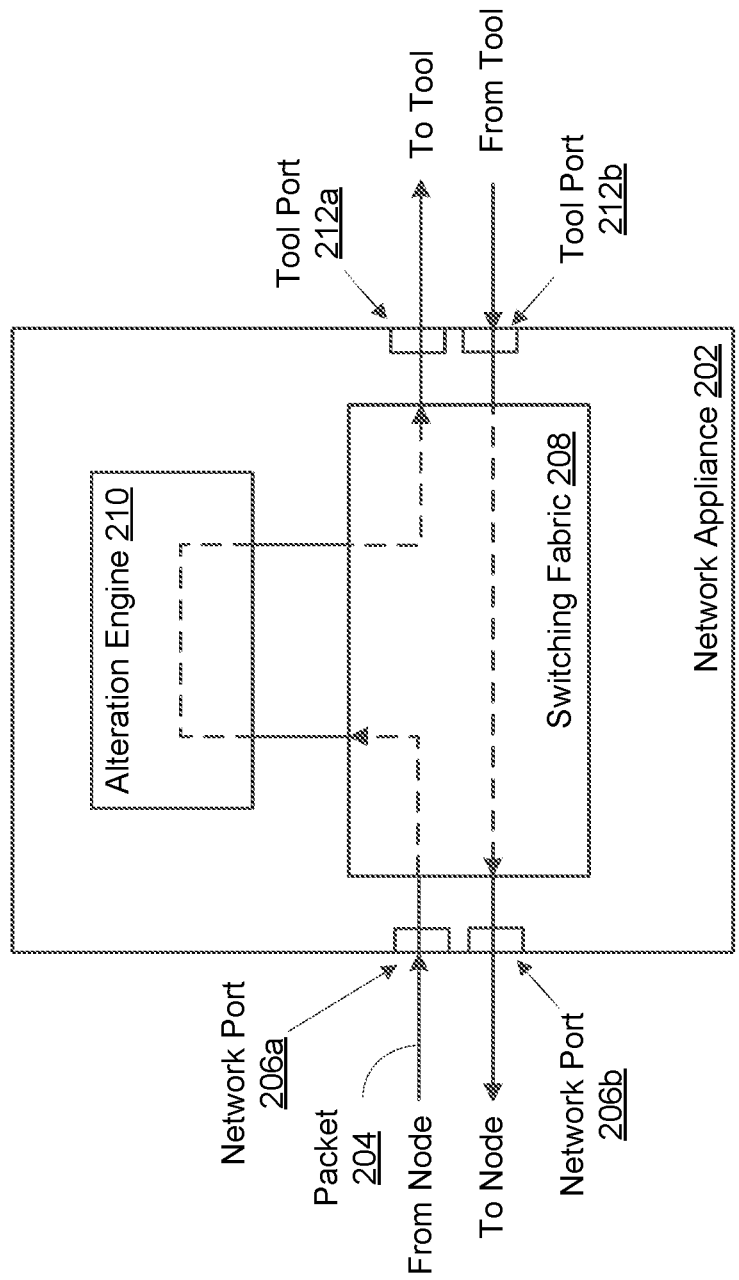
FIG. 2B illustrates another embodiment of a network appliance.

FIGS. 2A-B illustrate different embodiments of a network appliance 202. The network appliance 202 can include a switching fabric 208 (e.g., a processor) operable to receive a packet 204 on a network port 206*a* from a node within a computer network. Upon receiving the packet 204, the switching fabric 208 identifies a flow map corresponding to the data packet 204 based on one or more characteristics of the data packet. The flow map is typically one of a group of flow maps stored in a memory within or accessible to the network appliance 202.

The network appliance 202 can then determine whether a simulated error mode has been enabled for the identified flow map. When the simulated error mode is enabled, the switching fabric 208 of the network appliance 202 redirects the data packet 204 to an alteration engine 210 for modification. The alteration engine 210 makes one or more modifications to the data packet 204 to mimic malicious traffic. As further described below with respect to FIG. 4, the alteration engine 210 can modify control information (e.g., within a header or trailer) or the payload of the data packet 204.

The modified data packet is passed by the switching fabric 208 to a tool port 212*a* for transmission downstream to a network tool. When the network appliance 202 includes multiple network ports and/or multiple tool ports (as shown in FIG. 2B), the correct tool port is determined based on the flow map associated with the data packet 204. The network appliance 202 can then monitor the reaction of the network tool upon receiving the modified data packet 204 to determine whether the network tool responds appropriately. For example, the network appliance 202 may ensure that the network tool blocks or returns the modified data packet in accordance with a security policy. In some embodiments, the network appliance 202 is configured to monitor whether the modified data packet is returned to the network appliance (e.g., on return tool port 212*b*) by the network tool after the modified data packet is sent to the network tool by the network appliance through tool port 212*a*. When tool port 212*a* and return tool port 212*b* are both communicatively coupled to the network tool, the network appliance 202 and the network tool can be positioned in the data path between the originating node and the destination node. The network tool and network appliance 202 could also be positioned in the data path between the originating node and the destination node if the network tool and network appliance 202 are coupled to one another via a bidirectional tool port located on the network appliance 202. Thus, by transmitting an intentionally modified data packet to the network tool, the network appliance 202 is able simulate the receipt of malicious traffic by the network tool and ensure that the network tool handles abnormal (e.g., malicious) traffic appropriately.

Such a technique is particularly useful when the network tool is initially an out-of-band device, but an administrator (e.g., owner and/or operator of the network appliance 202)

wishes to change the deployment configuration and make the network tool an inline device. Because of the increased risks posed by security threats to an inline device, the administrator may wish to ensure the network tool acts in accordance with a security protocol (e.g., by blocking abnormal traffic) before making the network tool operational as an inline device. Said another way, the network appliance can be used for network tool verification before a network tool is changed from an out-of-band device to an inline device (as well as in other contexts).

Figure 3:
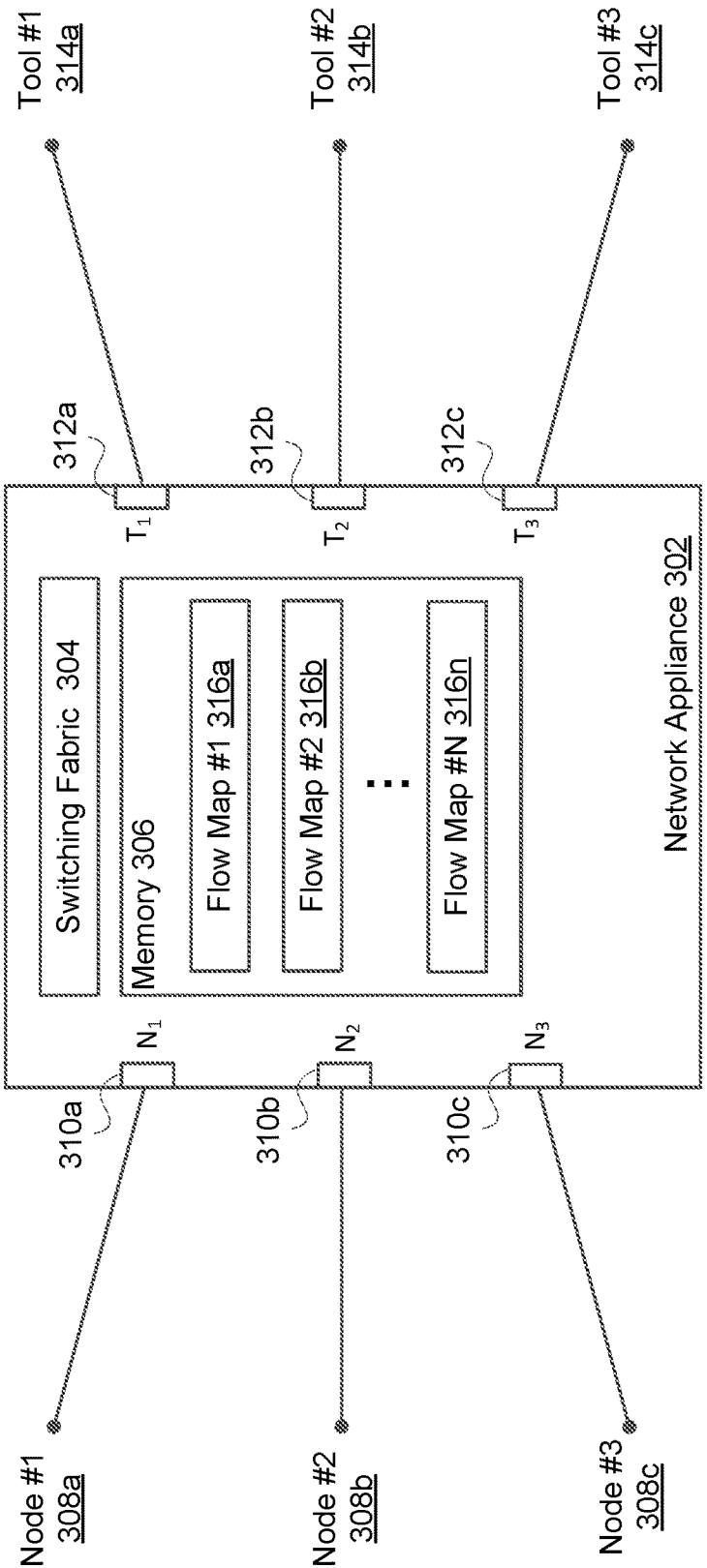
FIG. 3 illustrates a network appliance that has multiple network ports and multiple tool ports.

FIG. 3 illustrates a network appliance 302 having multiple network ports 310a-c and multiple tool ports 312a-c in accordance with some embodiments. The network appliance 302 can receive multiple streams of data packets simultaneously at different network ports (e.g., $N_1$, $N_2$, and $N_3$).

When a stream of data packets is received, the network appliance 302 analyzes the network port on which the data packets were received (e.g., network port 310a-c), the source node from which the data packets were received (e.g., nodes 308a-c), or one or more characteristics of the data packets to identify an appropriate flow map from a group of flow maps 316a-n stored in the memory 306. The characteristic(s) could include, for example, the communication protocol of which the data packets are a part or a session feature (e.g., a timestamp). Thus, the group of flow maps 316a-n, which could include hundreds or thousands or individual flow maps, specifies how data packets received by the network appliance 302 are to be handled based on the characteristic(s) of those data packets. The simulated error mode described herein can be enabled or disabled for each flow map within the memory 306 (i.e., on a per-flow map basis), which allows an administrator to readily and easily test the security of specific network tools to which the network appliance 302 is coupled via one or more tool ports 312a-c (e.g., $T_1$, $T_2$, and $T_3$).

Figure 4:
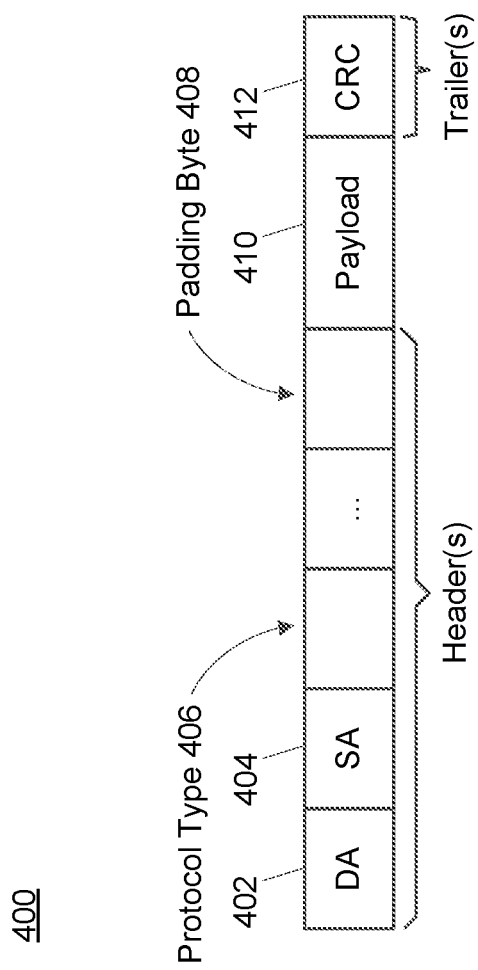
FIG. 4 illustrates an example of a data packet that can be modified by an alteration engine of a network appliance.

FIG. 4 illustrates an example of a data packet 400 that could be modified by an alteration engine of a network appliance. The data packet 400 includes both a payload 410 and control information, such as the destination address (DA) 402, source address (SA) 404, the communication protocol used 406, the length of the data packet, and checksums (e.g., cyclic redundancy check information 412). Typically, the control information is contained within headers (i.e., data fields that precede the payload), trailers (i.e., data fields that follow the payload), or some combination thereof. The payload includes the content (also referred to as "user data") that is to be transmitted downstream. In some cases, the data packet 400 also includes one or more padding bytes 408 (e.g., separating the payload from the control information). Data packets received by the network appliance could include some or all of these data fields, as well as additional data fields not specified herein. Moreover, these data fields could be in any arrangement. FIG. 4 simply illustrates one example sequence of data fields within a data packet 400.

Rather than inject new data fields into the data packet 400 or new bits into a data field, the alteration engine can modify the data packet 400 by modifying an existing data field. For example, the alteration engine could flip a single bit (i.e., change the value of a binary data field from one to zero, or vice versa) or selected bits. Two different techniques are described below that can be used to select which bit(s) are modified by the alternation engine. Other techniques (e.g., an intelligent heuristic-based or algorithm-based technique) could also be used.

When in a "fixed mode," the alteration engine modifies a particular bit (or bits) of each data packet associated with a given flow map. For example, the alternation engine can modify a padding byte that precedes the payload on each data packet. When in a "random mode," the alteration engine randomly selects a bit (or bits) from within a predetermined range of bits. For example, the alternation engine could modify any of the bits within the data field specifying protocol type or any of the first "n" bits of the data packet, where "n" is an integer value.

Figure 5:
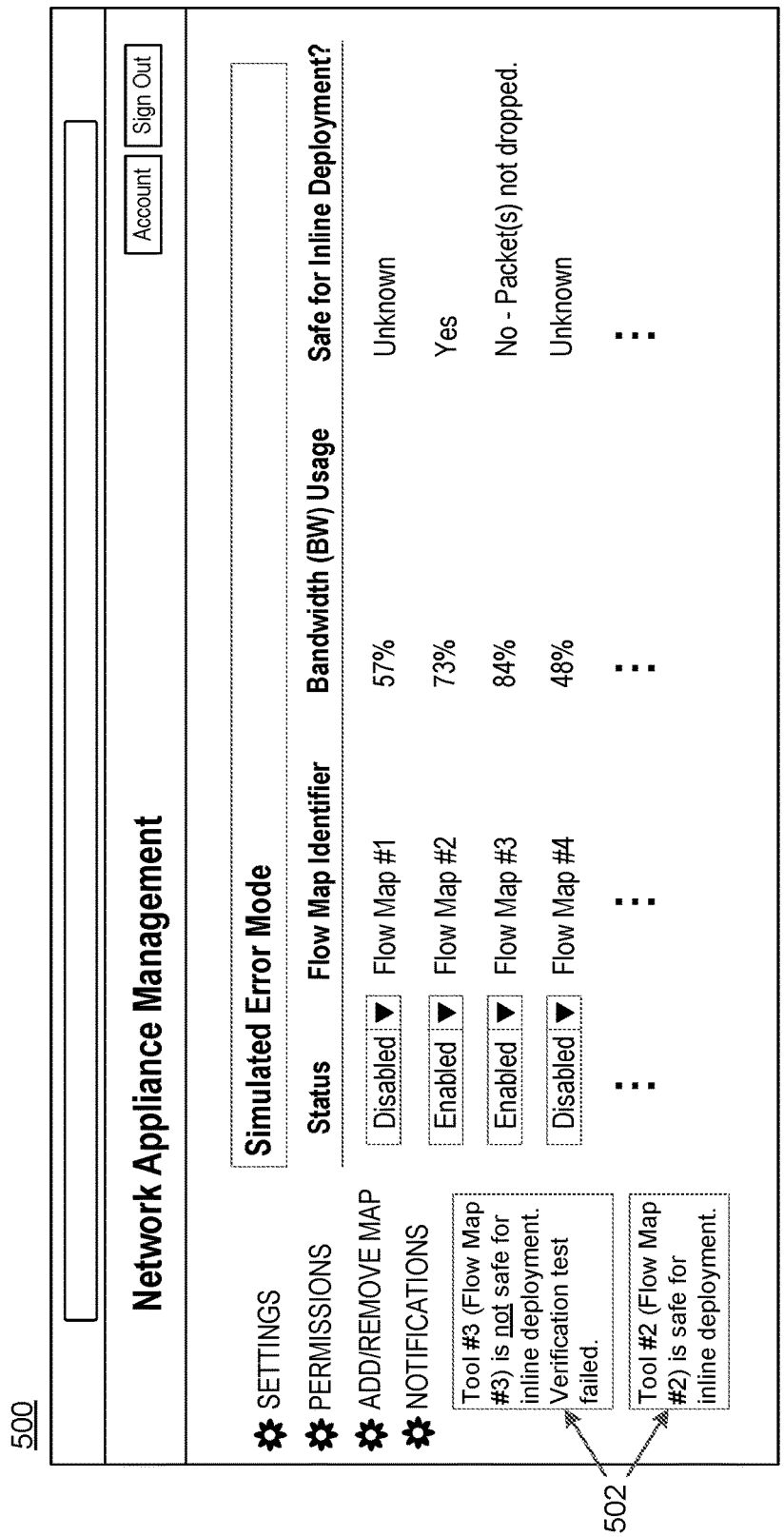
FIG. 5 illustrates a graphical user interface (GUI) through which an administrator can indicate whether a simulated error mode should be enabled or disabled for a flow map used by a network appliance.

FIG. 5 illustrates an example of a graphical user interface (GUI) 500 through which an administrator can indicate whether a simulated error mode should be enabled or disabled for a flow map used by a network appliance. The GUI 500 is preferably generated by the network appliance 102 as a network-accessible interface that the administrator is able to access remotely using a user device (e.g., mobile phone, tablet, laptop computer or desktop computer) or using locally connected input/output device(s). The GUI 500 can be accessible via the Internet (e.g., as a browser-based portal), as a desktop software application, and/or as a mobile application.

As shown in FIG. 5, the GUI 500 allows an administrator to specify whether a simulated error mode is enabled for each flow map maintained by the network appliance. That is, the administrator can enable or disable the simulated error mode on a per-flow map basis. Consequently, the administrator can easily enable and/or disable the simulated error mode while testing the security of particular network tools. Because long-term modification of data packets is generally undesirable (e.g., from both a security and quality perspective), it is important that the administrator be able to readily toggle whether the simulated error mode is enabled.

The GUI 500 may also present information for specific flow maps, such as the percent of maximum bandwidth (BW) used, whether the corresponding tool is safe for deployment as an inline device, etc. In some embodiments, notifications 502 are presented within the GUI 500 that summarize recent results of verification testing. For example, separate notifications may indicate that the tool corresponding to flow map #2 passed a verification test (i.e., has been verified and is safe for deployment as an inline device), and that the tool corresponding to flow map #3 failed the verification test.

Figure 6:
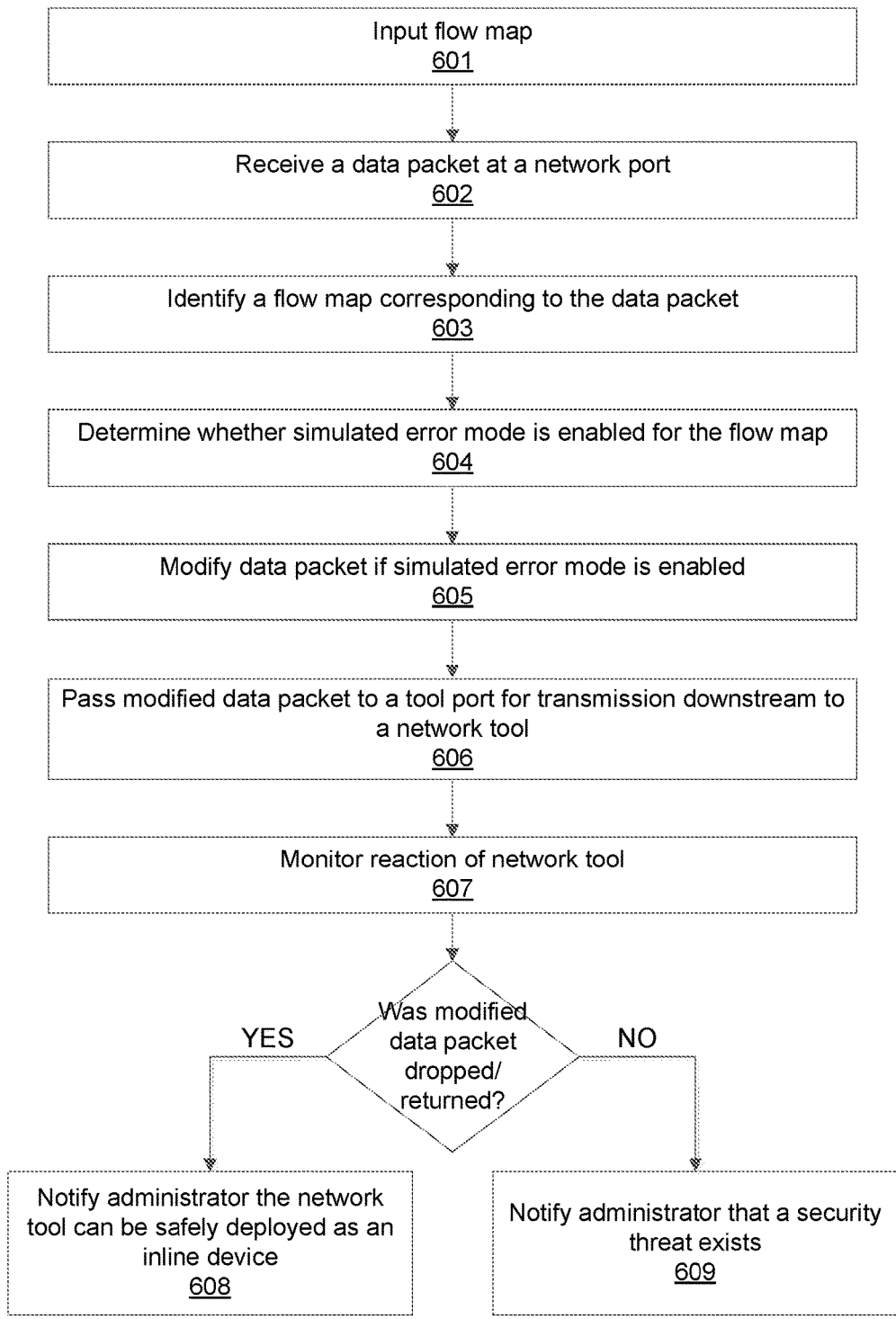
FIG. 6 depicts a process in which a data packet is modified and transmitted downstream to verify the security of a network tool before the network tool is deployed as an inline device.

FIG. 6 depicts a process in which a data packet is modified and transmitted downstream to a network tool to verify the proper functionality of a network tool before the network tool is deployed as an inline device (i.e., within the flow of network traffic). An administrator initially inputs or loads from a memory (e.g., by using an interface accessible via a user device, such as GUI 500 of FIG. 5) one or more flow maps that specify how data packets received by a network appliance are to be handled. The flow map(s) are input by the network appliance based on user input (step 601). For example, the flow map(s) could be input directly by a user or located in a memory based on the user's input. A flow map could include, for example, rules for aggregating, filtering, modifying, forwarding, etc., the data packets.

When the network appliance receives a data packet at a network port (step 602), a switching fabric of the network appliance determines which flow map(s) correspond to the data packet (step 603). The appropriate flow map(s) are selected (e.g., by the switching fabric or an associated processor/logic circuitry) from the group of flow maps based on one or more characteristics of the data packet. An alteration engine of the network appliance then determines whether a simulated error mode has been enabled for the flow map (step 604). The simulated error mode could be enabled, for example, by an administrator through the same interface used to input the flow map(s) (e.g., GUI 500 of FIG. 5) or a separate interface.

If the simulated error mode is enabled, the data packet is modified by the network appliance (step 605). For example, the alteration engine may be configured to modify (e.g., flip) one or more bits in the data packet. One of at least two different techniques is generally used to select which bit(s) are modified by the alteration engine. When in a "fixed mode," the alteration engine modifies a particular bit (or bits) of the data packet. The particular bit(s) may be predetermined by the administrator or a processing system (e.g., the network appliance or a remote processing device). When in a "random mode," the alteration engine randomly selects a bit (or bits) from within a predetermined range of bits. Note that other techniques (e.g., randomly selecting a bit from anywhere in the data packet) could also be used and, in fact, may be preferred in certain embodiments. The modified data packet can then be passed to a tool port (e.g., by the switching fabric of the network appliance) for transmission downstream to a network tool (step 606).

After the modified data packet is passed to the tool port, the network appliance and/or the administrator can monitor operation of the network tool (step 607) to determine whether the network tool responds appropriately upon receiving the modified data packet, which mimics abnormal (e.g., malicious) traffic. More specifically, the switching fabric, alteration engine, or some other component of the network appliance and/or the administrator can ensure the network tool acts in accordance with a security protocol upon receiving the modified data packet. A normal response typically results in the modified data packet being blocked by the network tool.

If the network tool properly executes the security protocol (e.g., by blocking the modified data packet), the network appliance may notify the administrator that the network tool can be safely deployed as an inline device (step 608). For example, a processor may be configured to generate and transmit a notification to the administrator. However, if the network tool fails to execute the security protocol (e.g., by accepting the modified data packet), the network appliance can notify the administrator that a security threat exists (step 609). The existence of a security threat typically prevents or inhibits the administrator from deploying the network tool as an inline device. Thus, the security threat is preferably analyzed and dealt with before the network tool is deployed as an inline device Modification of the data packet and subsequent transmission of the modified data packet downstream to a network tool is intended to controllably simulate the receipt of abnormal (e.g., malicious) traffic by the network tool. Because the network appliance is responsible for modifying data packets, the network appliance can easily identify which data packets have been modified and, thus, should be blocked by the network tool. Hence, if those packets are nonetheless forwarded back to the network appliance by the network tool via its return tool port, the network appliance can make a determination that the network tool may not be functioning properly and/or can generate an alert indicative of that condition. These techniques allow the network tool to be verified before being deployed as an inline device.

Figure 7:
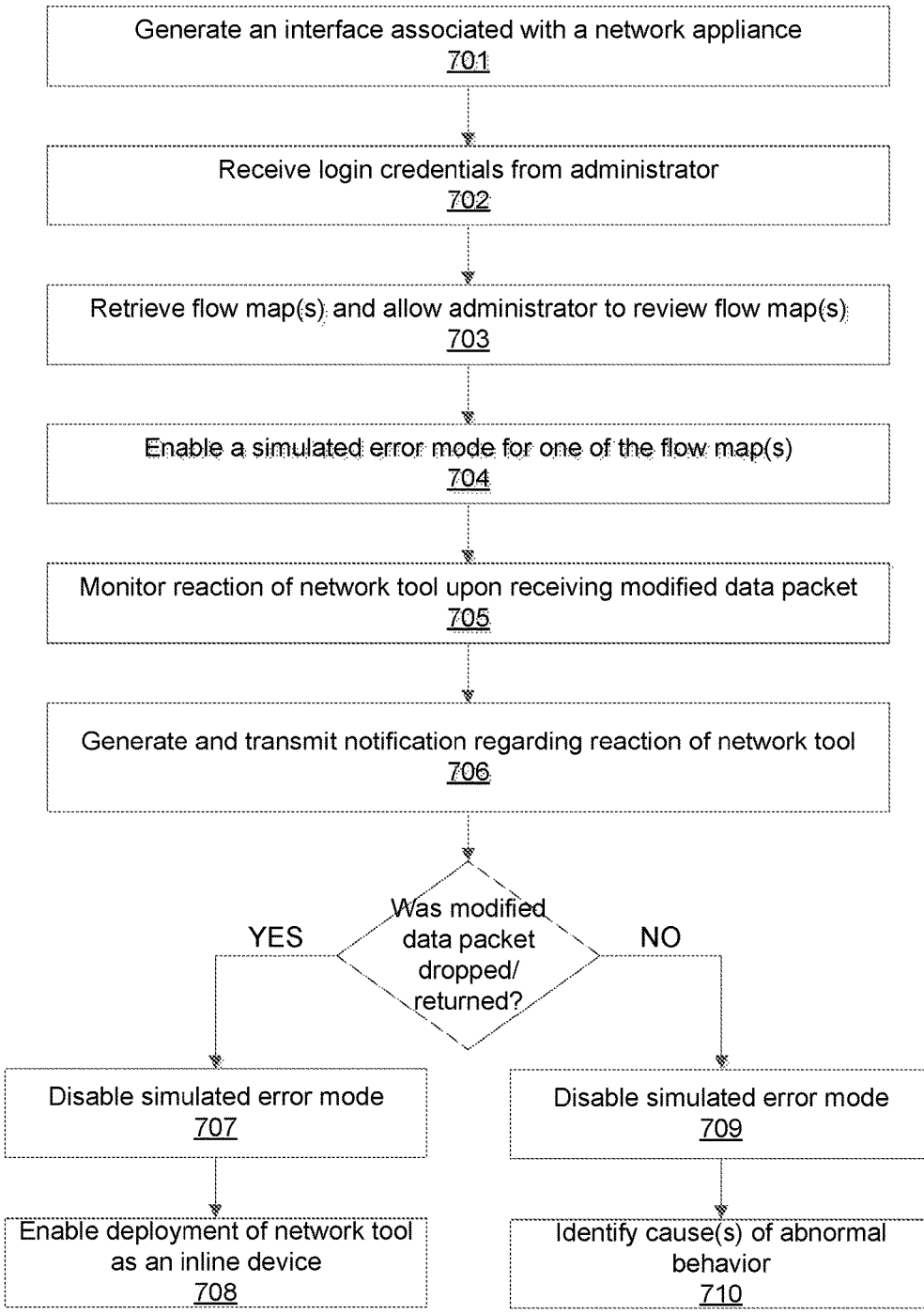
FIG. 7 depicts a process in which an administrator enables and then subsequently disables a simulated error mode for a flow map used by a network appliance.

FIG. 7 depicts a process in which an administrator enables and then subsequently disables a simulated error mode for a flow map used by a network appliance. The administrator initially accesses an interface (e.g., GUI 500 of FIG. 5) associated with the network appliance (step 701). The interface is accessible via a user device and, in some embodiments, is configured to be accessible by multiple user devices (e.g., mobile phone and laptop computer). The interface could also be adapted for a specific user device. For example, the interface may be accessible via a browser-based portal configured for a laptop or desktop computer or via a mobile application configured for a mobile phone.

In some embodiments, the interface prompts the administrator to enter login credentials (step 702). The login credentials could be associated with an entity (e.g., company) that currently owns, or previously manufactured, the network appliance. Upon logging into the interface, the administrator can review one or more flow maps (step 703), and enable a simulated error mode for one of the flow map(s) (step 704). Some or all of the flow map(s) may have been previously input by the administrator and stored in a memory within (or accessible to) the network appliance. As noted above, the simulated error mode causes the network appliance to modify at least some of the data packets received by the network appliance that are associated with the flow map for which the simulated error mode has been enabled.

The administrator can then monitor the reaction of the network tool upon receiving the modified data packet (step 705). In some embodiments, the switching fabric, the alteration engine, or some other component of the network appliance also monitors the reaction of the network tool and automatically notifies the administrator of the outcome (step 706). For example, the network appliance may be configured to transmit an email message to an email address associated with the administrator, transmit a text message to a phone number associated with the administrator, and/or post a notification to the interface the administrator used to enable the simulated error mode.

If the network tool responds appropriately (e.g., by blocking the modified data packet), the administrator can disable the simulated error mode (step 707) and deploy the network tool as an inline device (step 708). That is, an appropriate response is indicative of a network tool that is secure and has passed the verification test. If the network tool does not react as expected (e.g., by accepting the modified data packet and forwarding it back to the network appliance), the administrator can take steps to identify the source of the abnormal behavior (step 710). The administrator may also opt to disable the simulated error mode (step 709) while attempting to determine the underlying cause(s) of the abnormal behavior.

Processing System

Figure 8:
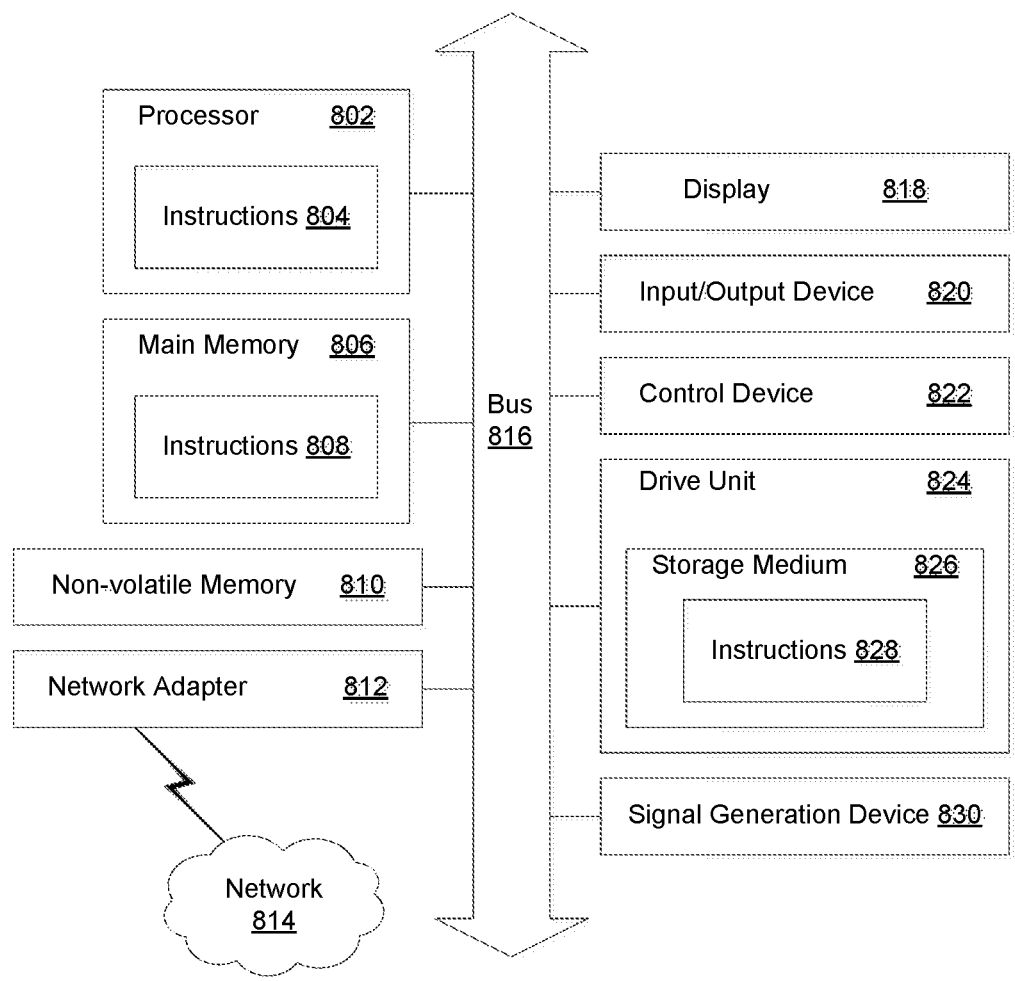
FIG. 8 is a high-level block diagram of a computing system that can be used to facilitate at least some of the techniques described herein.

FIG. 8 is a block diagram illustrating an example of a processing system 800 in which at least some operations described herein can be implemented. For example, the processing system 800 may be responsible for generating the interface through which the administrator inputs flow maps and/or enables and disables the simulated error mode. As another example, at least a portion of the processing system 800 may be included in a network appliance (in that case, the processing system 800 may not include a display 818, but could instead include a switching fabric and tool port(s)). The computing system may include one or more central processing units ("processors") 802, main memory 806, non-volatile memory 810, network adapter 812 (e.g., network interfaces), display 818, input/output devices 820, control device 822 (e.g., keyboard and pointing devices), drive unit 824 including a storage medium 826, and signal generation device 830 that are communicatively connected to a bus 816. The bus 816 is illustrated as an abstraction that represents any one or more separate physical buses, point to point connections, or both connected by appropriate bridges, adapters, or controllers. The bus 816, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire." A bus may also be responsible for relaying data packets (e.g., via full or half duplex wires) between components of the network appliance, such as the switching fabric, network port(s), tool port(s), etc.

In various embodiments, the processing system 800 operates as a standalone device, although the processing system 800 may be connected (e.g., wired or wirelessly) to other machines. For example, the processing system 800 may include a terminal that is coupled directly to a network appliance. As another example, the computing system 800 may be wirelessly coupled to the network appliance.

In various embodiments, the processing system 800 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by the computing system.

While the main memory 806, non-volatile memory 810, and storage medium 826 (also called a "machine-readable medium) are shown to be a single medium, the term "machine-readable medium" and "storage medium" should be taken to include a single medium or multiple media (e.g., a centralized or distributed database, and/or associated caches and servers) that store one or more sets of instructions 828. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 804, 808, 828) set at various times in various memory and storage devices in a computer, and that, when read and executed by one or more processing units or processors 802, cause the processing system 800 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 810, floppy and other removable disks, hard disk drives, optical disks (e.g., Compact Disk Read-Only Memory (CD ROMS), Digital Versatile Disks (DVDs)), and transmission type media such as digital and analog communication links.

The network adapter 812 enables the processing system 800 to mediate data in a network 814 with an entity that is external to the processing system 800, such as a network appliance, through any known and/or convenient communications protocol supported by the processing system 800 and the external entity. The network adapter 812 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 812 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:
   receiving a data packet at a network port of a network appliance that is configured to forward data packets along a data path from an originating node to a destination node on a network;
   identifying, by the network appliance, a flow map associated with the data packet, where the flow map represents a policy for how the data packet is to be handled by the network appliance;
   determining, by the network appliance, whether a simulated error mode has been enabled for the flow map;

in response to determining that the simulated error mode has been enabled,
modifying, by the network appliance, the data packet to produce a modified data packet that mimics abnormal traffic;
injecting, by the network appliance, the modified data packet into an outgoing traffic flow to be forwarded to a tool port of the network appliance for transmission downstream to a network tool, where the outgoing traffic flow includes the modified data packet and at least one unmodified data packet;
monitoring, by the network appliance, whether the modified data packet is blocked by the network tool in accordance with a security protocol, by determining whether the modified data packet is included in an incoming traffic flow received from the network tool; and
based on a determination of whether the modified data packet was blocked by the network tool,
generating, by the network appliance, an indication of health of the network tool that is indicative of whether the network tool is operating properly.

2. The method of claim 1, further comprising:
generating a notification indicative that a security risk exists; and
transmitting the notification to an administrator.

3. The method of claim 1, further comprising:
generating a notification that specifies that a security risk exists; and
causing the notification to be presented on a management interface that is accessible by a user device associated with an administrator.

4. The method of claim 1, further comprising:
based on a determination that the modified data packet was blocked by the network tool,
generating, by the network appliance, an indication of health of the network tool indicative that the network tool is operating properly.

5. The method of claim 4, wherein the modified data packet is one of a plurality of modified data packets blocked by the network tool, and wherein the indication of health indicative that the network tool is operating properly is not generated unless a predetermined percentage of all modified data packets transmitted to the network tool are dropped by the network tool.

6. The method of claim 5, wherein the predetermined percentage is specified by an administrator.

7. The method of claim 1, wherein the network port is one of a plurality of network ports of the network appliance, and wherein each of the plurality of network ports is coupled to a different node within a computer network.

8. The method of claim 1, wherein the tool port is one of a plurality of tool ports of the network appliance, and wherein each of the plurality of tool ports is coupled to a different network tool.

9. The method of claim 1, wherein said identifying a flow map associated with the data packet comprises:
recognizing a tool port of the network appliance on which the data packet was received, a source node from which the data packet was received, or a characteristic of the data packet; and
selecting the flow map from a plurality of flow maps based on the tool port, the source node, or the characteristic of the data packet.

10. The method of claim 1, wherein said modifying comprises:
altering a bit that resides in a header or a trailer of the data packet.

11. A method comprising:
receiving a data packet at a network port of a network appliance that is configured to forward data packets along a data path from an originating node to a destination node on a network;
modifying, by the network appliance, the data packet to produce a modified data packet;
injecting, by the network appliance, the modified data packet into an outgoing traffic flow to be transmitted from the network appliance, via a first tool port of the network appliance, downstream along the data path to a network tool that is configured to operate within the data path from the originating node to the destination node, where the outgoing traffic flow includes the modified data packet and at least one unmodified data packet;
determining, by the network appliance, whether the modified data packet has been forwarded by the network tool back to the network appliance along the data path, by determining whether the modified data packet is included in an incoming traffic flow received at a second tool port of the network appliance; and
generating, by the network appliance, an indication of functionality or health of the network tool, based on a determination of whether the modified data packet has been forwarded by the network tool back to the network appliance along the data path.

12. The method of claim 11, wherein said modifying includes altering a bit that resides within a payload of the data packet.

13. The method of claim 11, wherein the modified data packet is one of a plurality of modified data packets transmitted downstream to the network tool.

14. The method of claim 11, wherein said modifying comprises:
identifying, by the network appliance, a bit within the data packet to be altered by the network appliance, where the bit to be altered is predetermined by the network appliance or an administrator; and
altering, by the network appliance, the bit by flipping the bit.

15. The method of claim 11, wherein said modifying comprises:
identifying, by the network appliance, a bit within the data packet to be altered by the network appliance, where the bit to be altered is randomly selected from a predetermined subset of bits in the data packet; and
altering, by the network appliance, the bit by flipping the bit.

16. A network appliance comprising:
a processor;
a first network port at which to receive data packets sent by an originating node;
a second network port through which to forward at least some of the data packets to a destination node;
a first tool port through which to forward an outgoing traffic flow along a data path to a network tool;
a second tool port at which to receive an incoming traffic flow from the network tool;
a switching fabric coupled between the network ports and the tool ports; and
a memory coupled to the processor and configured to store instructions, which, when executed by the processor, cause the processor to perform operations including:

identifying a flow map associated with a data packet received at the first network port;

determining whether a simulated error mode is enabled for the flow map;

in response to determining the simulated error mode is enabled, modifying the data packet by altering a bit within the data packet to produce a modified data packet;

injecting the modified data packet into the outgoing traffic flow to be passed to the first tool port for transmission downstream to the network tool, where the outgoing traffic flow includes the modified data packet and at least one unmodified data packet;

determining whether the network tool blocked the modified data packet, by determining whether the modified data packet is included in the incoming traffic flow received at the second tool port; and in response to determining that the network tool blocked the modified data packet, providing an indication of health of the network tool that is indicative of whether the network tool is operating properly.

17. The network appliance of claim 16, wherein the operations further comprise:

generating an interface accessible by a user device; and enabling an administrator to specify whether the simulated error mode is enabled for the flow map via the interface.

18. The network appliance of claim 17, wherein the administrator is able to specify whether the simulated error mode is enabled for each of a plurality of flow maps accessible to the network appliance using the interface.

19. The network appliance of claim 18, wherein at least some of the plurality of flow maps are stored in the memory.

20. The network appliance of claim 16, wherein said providing comprises performing at least one of:

transmitting an email message to an email address of an administrator associated with the network appliance;

transmitting a text message to a phone number of the administrator; or posting a notification to an interface accessible by the administrator.

* * * * *